Jan. 24, 1928.

O D TEEL 1,657,419

WRIST PIN FOR MOWING MACHINES

Filed Feb. 16, 1927

WITNESSES
F. H. Saylor

INVENTOR
O D Teel.
BY
ATTORNEY

Patented Jan. 24, 1928.

1,657,419

UNITED STATES PATENT OFFICE.

O D TEEL, OF ECHO, OREGON.

WRIST PIN FOR MOWING MACHINES.

Application filed February 16, 1927. Serial No. 168,721.

This invention relates to a wrist pin intended primarily for mowing machines, although it may be applied to other machinery. It constitutes an improvement on my previous Patent No. 1,579,969.

The object of the invention is especially to provide a device of this character wherein the wrist pin may be firmly and securely fastened to the crank disk in such a manner as to prevent the wrist pin from turning relative to the crank disk.

Another object of the invention is to provide a construction so the wrist pin may be readily assembled with and taken from the crank disk. In this way the replacement of worn wrist pins is greatly facilitated.

A further object is to provide a device of the character specified having the advantages and capacities mentioned and which is simple and durable in construction, reliable and efficient in operation and easy and comparatively inexpensive to manufacture.

Figure 1:
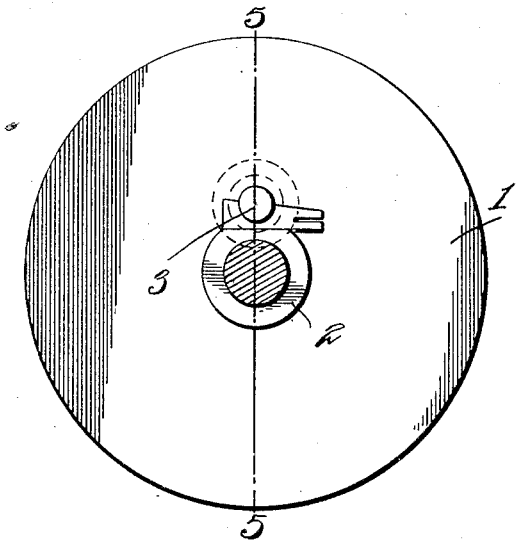
Figure 2:
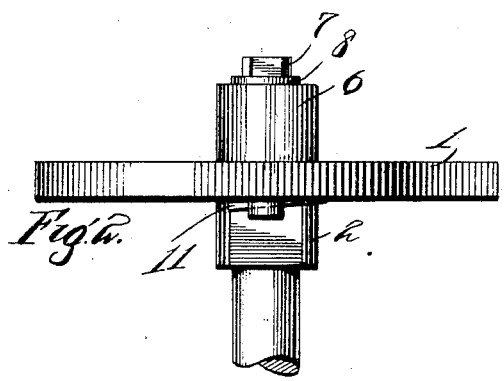
Figure 5:
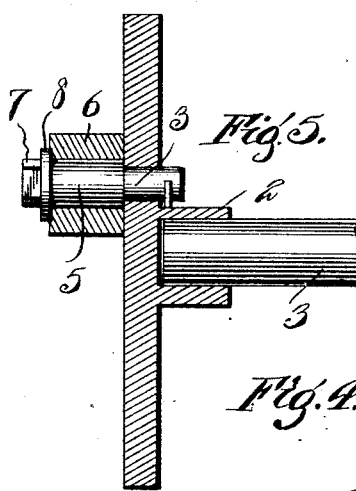
Figure 3:
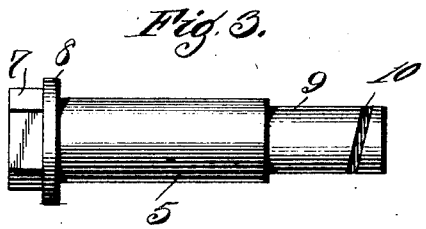
Figure 4:
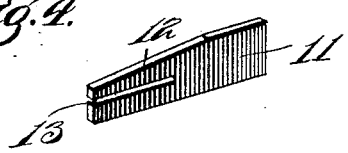

Other objects and advantages reside in certain novel features of construction, arrangements and combinations of parts which will be hereinafter more fully described and particularly pointed out in the appended claims, reference being had to the accompanying drawings forming a part of this specification, in which:

Figure 1 is a plan view taken from a position looking down on the end of the wrist pin and side of the crank disk assembled together, Figure 2 is a side elevation of the same construction, Figure 3 is a side view of the unassembled wrist pin, Figure 4 is a perspective view of the flat taper key, Figure 5 shows a side elevation of the crank disk assembly turned 90° from the position shown in Figure 2.

Referring to the drawings, numeral 1 designates the crank wheel or disk of a mowing machine which has the usual hub 2 projecting laterally therefrom. This disk is formed with an opening 3 in the hub 2 adapted to provide a mounting for the wrist pin designated generally at 4. The wrist pin 4 has a main portion 5 on which the pitman eye 6 is to be fastened by means of a nut and washer 7 and 8. The mounting portion 9 of the wrist pin 4 is fitted in the opening 3 of the crank disk and the end portion of 9 projects beyond the disk and lies adjacent to, but slightly spaced from the hub 2 of the crank disk. A fastening element 10 and 11 is provided and takes the form of a narrow rectangular keyway 10, pierced through portion 9 of the pin, and a tapered rectangular comparatively thin key 11, fitting therein in driven relation. The keyway 10 is in a somewhat angular position in respect to the axis of the shaft although the angle is not a large one. The walls of this keyway are made preferably slightly tapered, in conformity with the taper of the key. The longer dimension of the key is preferably across the diameter of the shaft.

The key 11 is made preferably as shown in Figure 4, that is, having a tapered portion 12 on one side and a slit 13 in its lower end to provide a certain springiness. The opposite side or edge of the key 11 is straight as indicated at 14 to frictionally engage a flattened surface 15 formed on the hub 2 in opposed relation to the keyway 10 in the wrist pin.

In operation, the various elements are assembled together as shown in Figure 2, the key being interposed between the flattened surface 14 and the end 9 of the wrist pin is driven through the shaft keyway, which inclines toward the disk, until the lower end of the key impinges on the side of the disk. As the key is driven home its tapered edge 12 riding over the tapered wall of the keyway is forced laterally, wedging its straight edge 15 against the flattened surface 14. The wrist pin is by this means held securely in abutment to the disk, but may be easily disassembled therefrom when required.

I claim:—

1. In combination with a crank disk having a hub and an opening, a wrist pin having a mounting portion fitted in the opening of the crank disk and projecting beyond the crank disk and over the hub, a fastening device comprising a keyway through the wrist pin and a key therethrough, said key impinging on the side of the crank disk adjacent to the key.

2. In combination with a crank disk having a hub and also having an opening adapted to receive a wrist pin, a wrist pin having a mounting portion fitted in the opening of the crank disk and having a portion extending beyond the crank disk and disposed adjacent the hub and a rectangular keyway therethrough, said keyway inclined at a slight angle toward the crank disk, a tapered key therethrough sufficiently long to permit a substantial portion of its end to impinge upon the crank disk when driven into the keyway.

3. In combination a flat body having an opening, a pin insertable in the opening with one end projecting beyond one face of the body and having a transversely extending and obliquely disposed keyway, and a key insertable in the keyway with one end bindingly engaging the flat body to secure the pin and body together.

4. A wrist pin having a mounting portion and an extending portion, said extending portion being pierced by a substantially rectangular keyway, the longer dimension of which lies across the shaft, said keyway being slightly inclined.

5. In combination a rotatable element having a laterally extending projection upon one side and provided with a flat surface, a wrist pin passing through the rotatable element with one end opposed to the flat surface, and a retaining member wedged between the flat surface and wrist pin to retain the latter to the rotatable element.

6. In combination a rotatable element having a laterally extending projection upon one side provided with a flat surface, a wrist pin passing through the rotatable element and having a keyway opposed to the flat surface, and a key received in the keyway and bindingly engaging the wrist pin and flat surface.

7. In combination a wrist pin insertable through an opening in a body and having a transverse keyway extending at an oblique angle with respect to the longitudinal axis of the wrist pin, and a key insertable in the keyway with one end adapted to bindingly engage the body to secure the wrist pin to the latter.

O D TEEL.